(12) United States Patent
Miller et al.

(10) Patent No.: US 8,092,768 B2
(45) Date of Patent: Jan. 10, 2012

(54) ADVANCED PARTICULATE MATTER CONTROL APPARATUS AND METHODS

(75) Inventors: Stanley J. Miller, Grand Forks, ND (US); Ye Zhuang, Grand Forks, ND (US); Jay C. Almlie, East Grand Forks, MN (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 64 days.

(21) Appl. No.: 12/814,046

(22) Filed: Jun. 11, 2010

(65) Prior Publication Data

US 2011/0195002 A1 Aug. 11, 2011

Related U.S. Application Data

(60) Provisional application No. 61/303,493, filed on Feb. 11, 2010.

(51) Int. Cl.
| | |
|---|---|
| B01D 35/06 | (2006.01) |
| B01D 37/00 | (2006.01) |
| B01D 46/00 | (2006.01) |
| B01D 46/50 | (2006.01) |

(52) U.S. Cl. ............ 423/215.5; 55/529; 55/DIG. 30; 95/2; 95/57; 95/273; 95/291; 96/66; 96/68

(58) Field of Classification Search ............ 423/215.5; 55/529, DIG. 30; 95/2, 57, 273, 291; 96/66, 96/68

See application file for complete search history.

(56) References Cited

U.S. PATENT DOCUMENTS

| | | | |
|---|---|---|---|
| 5,540,761 | A | 7/1996 | Yamamoto |
| 6,544,317 | B2 | 4/2003 | Miller |
| 2001/0037941 | A1 | 11/2001 | Thompson |
| 2007/0137486 | A1 | 6/2007 | Bergeron et al. |
| 2009/0071339 | A1 | 3/2009 | Suzuki et al. |
| 2009/0133582 | A1 | 5/2009 | Snowball |
| 2011/0195002 | A1* | 8/2011 | Miller et al. .......... 423/210 |

* cited by examiner

*Primary Examiner* — Timothy Vanoy
(74) *Attorney, Agent, or Firm* — Gifford, Krass, Sprinkle, Anderson & Citkowski, P.C.

(57) ABSTRACT

Apparatus and methods for collection and removal of particulate matter, including fine particulate matter, from a gas stream, comprising a unique combination of high collection efficiency and ultralow pressure drop across the filter. The apparatus and method utilize simultaneous electrostatic precipitation and membrane filtration of a particular pore size, wherein electrostatic collection and filtration occur on the same surface.

20 Claims, 7 Drawing Sheets

ADVANCED PARTICULATE MATTER CONTROL APPARATUS AND METHODS

CROSS-REFERENCE TO RELATED APPLICATIONS

This application claims the benefit under 35 U.S.C. Section 119(e) of U.S. Provisional Patent Application No. 61/303,493 entitled "Advanced Particulate Matter Control Apparatus and Methods," filed Feb. 11, 2010, the disclosure of which is hereby incorporated herein by reference.

STATEMENT REGARDING FEDERALLY SPONSORED RESEARCH OR DEVELOPMENT

This invention was made with U.S. Government support under the U.S. Department of Energy Cooperative Agreement No. DE-FC26-98FT40320, Base Cooperative Agreement, Task 2.5—Emissions Control for Diesel Systems. The U.S. Government has certain rights in this invention.

FIELD OF THE INVENTION

The present invention relates to the collection of particulate materials, and in particular, the present invention relates to an apparatus and process for the collection of particles entrained in a gas stream.

BACKGROUND OF THE INVENTION

The control of fine particles by filtration alone depends on capturing the particles using three possible mechanisms: impaction, interception, or diffusion, with the dominant collection mechanisms for submicron-sized particles known to be interception and diffusion. Filters can be designed and manufactured with small pore sizes such that submicron particles are collected with high efficiency. However, such filters exhibit a substantial pressure drop for gas flowing therethrough with an associated rapid increase in back pressure as the particles collect on the filter surface.

Alternatively, a decrease in pressure drop across the filter can be obtained by employing increased pore sizes, however the collection efficiency of such larger pore size filters is not acceptable. As such, a balance between pore size, need for low pressure drop and collection efficiency is a theoretical limitation for all filters that rely on primary filtration collection mechanisms.

In an effort to overcome the above-stated limitation, electrostatic mechanisms have been developed to drive particles to a collection surface without plugging filter pore openings. However, conventional electrostatic collectors have been limited by long distances that particles must travel in order to reach a grounded surface. Accordingly, a particulate collection apparatus and process for combining high particle collection efficiency, low filter pressure drop and regeneration potential that is applicable for high temperature processes would be desirable.

SUMMARY OF THE INVENTION

The present invention discloses a collection apparatus having an electrostatic precipitator combined with a porous conductive filter membrane, both of which can be optionally packaged into a compact unit. Electrostatic precipitation can be used to both pre-collect particulate matter and to drive particulate matter to the filter membrane surface. The pre-collection can be employed to effectively limit the pressure drop across the conductive filter membrane and collect filter cake over time. The conductive filter membrane can also serve as a grounded collection plate and double in function as a porous media filter, thereby limiting passage of solid and aerosolized particulate matter while permitting gas flow with a low pressure drop across the collection apparatus.

In one embodiment, a particulate matter control process includes particulate matter-laden gas passing one or more high-voltage electrodes. The electrode(s) can have very sharp tips that when supplied with high voltage power, either of positive or negative polarity, can create local plasma zones that induce a charge on particles flowing past the electrode(s). Thereafter, the charged particles can be driven to an electrically grounded surface by an electrostatic field generated by the electrode.

The electrically grounded surface can be a pre-collection surface, a filter unit housing, a filter membrane and the like. In addition, a filter membrane can include a thin conductive membrane with pores whose mean diameter can range from about 1 to 1000 micrometers. The thin conductive membrane can thus act as a filter since the pores prevent particulate matter from penetrating or passing through the membrane. In this manner, high filtration velocities are provided while maintaining a low pressure drop across the filter membrane and high collection efficiencies.

In another embodiment, the present invention discloses an apparatus and a process for collection and removal of particulate matter, including fine particulate matter, from a gas stream. The apparatus and process provide a unique combination of high collection efficiency, ultralow pressure drop across the filter and superior cleaning ability.

In yet another embodiment, the present invention discloses an apparatus and process that utilizes simultaneous electrostatic precipitation and membrane filtration with electrostatic collection and filtration occurring on the same surface of a thin conductive membrane. The apparatus and process can further include one or more cleaning or regeneration mechanisms as are known to those skilled in the art in order to return performance of the apparatus to an initial before-exposure state. The regeneration of the apparatus can provide an increased level of cleaning compared to previously available apparatus and processes since the nature of the porous conductive filter employs pure surface filtration, and as such, generally no depth filtration occur and thus no inherent blinding is present.

In addition to the above, the apparatus and process can operate at temperatures ranging from less than minus 10° F. (−12° C.) to about 2000° F. (1093° C.) since the filter is made from a metallic material, thereby rendering at least one of the embodiments far less susceptible to thermal limitations than other available technologies.

The apparatus can be regenerated after reaching a maximum filter cake load by: 1) a high-pressure reverse pulse of air that drives accumulated filter cake off of the filter membrane surface; 2) a thermal process, e.g. applying a high electrical current to the conductive filter membrane and thereby heating the filter media to a temperature at which collected material is thermally destroyed, decomposed, etc.; 3) catalytic oxidation processes that convert hydrocarbons and other compounds to a gaseous form; 4) mechanical action including brushing or scraping filter cake off of the filter membrane surface; and 5) combinations thereof.

The apparatus and process can further include multiple membrane collection surfaces having various compositions, pore sizes, shapes, geometries, etc. For example and for illustrative purposes only, the pore size(s) of a porous conductive filter membrane of the present invention can be variable, similar in all stages, or smaller in successive stages. Similarly, high-voltage discharge electrodes and membrane surfaces can be arranged in various configurations, with different spacings and the like.

DETAILED DESCRIPTION OF THE PRESENT INVENTION

Nomenclature

Figure 1:
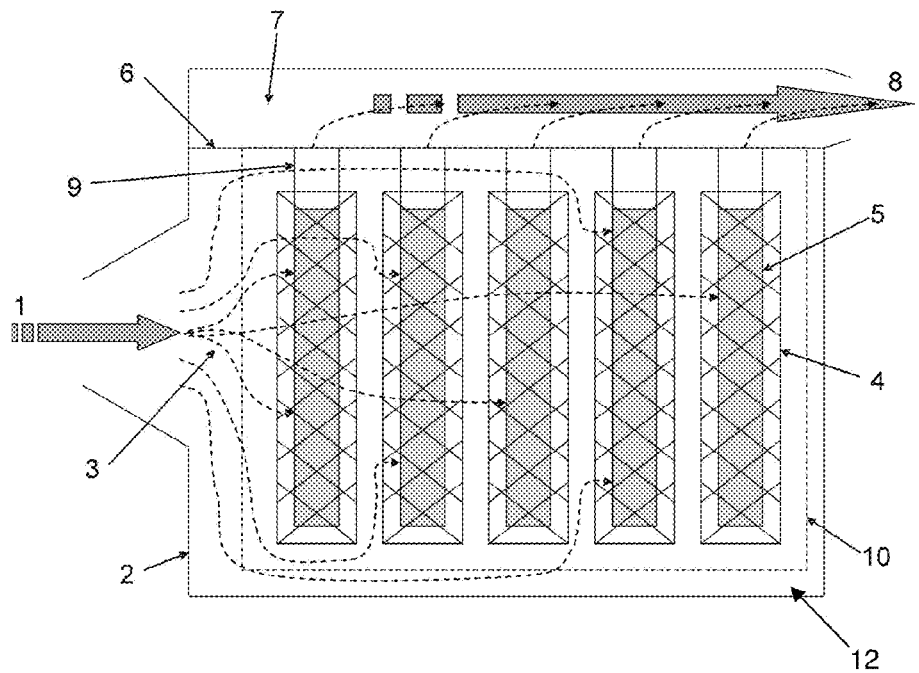
FIG. 1 is a schematic front view of a hybrid electrostatic precipitator/filter membrane according to an embodiment of the present invention.

For convenience, the term "LoP Filter" may be used herein to refer to the apparatus and methods of this disclosure. No limitation of the present invention is intended thereby. The terms "back pressure" and "pressure drop" are used interchangeably as is customary in the art. "Advanced hybrid particle collector" (or AHPC) refers to the Energy & Environmental Research Center's (EERC's) technology as disclosed in, for example, U.S. Pat. Nos. 5,938,818 and 6,544,317, both of which are incorporated herein in their entirety by reference. The term that quantifies both pressure drop and velocity with one parameter is called "drag," which is simply the pressure drop across a filter divided by a filter flow velocity, i.e. the velocity of gas flow through the filter.

Particulate Collection

The present invention provides a collection apparatus having an electrostatic precipitator combined with a filter. As such, the present invention has utility as a filter. In some instances, the electrostatic precipitator combined with the filter is packaged in a compact unit.

The electrostatic precipitator can use electrostatic precipitation to pre-collect particulate matter and to drive particulate matter to a porous conductive filter membrane surface. Precollection is employed to effectively limit the pressure drop across the conductive membrane and reduce filter cake that collects or accumulates over time. The porous conductive filter membrane can serve as a grounded collection plate, and also double in function as a porous media filter. In this manner, passage of solid and aerosolized particulate matter through the filter membrane is limited and yet gas can flow therethrough.

A process for controlling particulate matter is also provided. The process includes passing incoming particulate-laden gas by, and in proximity to, a high-voltage electrode with either positive or negative polarity. The electrode can have sharp or pointed tips, that when supplied with high-voltage power, can create local corona zones where a corona zone is hereby defined as a region of space eminating from the sharp point of each electrode tip where the gas is highly ionized. In addition, ions emitted from the corona zone can attach to particles flowing by the electrode to create electrically charged particles, the charged particles then driven to an electrically grounded surface by an electrostatic field generated between the electrode and grounded surface. It is appreciated that the electrically grounded surface can be a pre-collection surface, a filter unit housing, the filter membrane and the like.

The porous conductive filter membrane can be manufactured from any material known to those skilled in the art, illustratively including fine metallic mesh and the like. The filter membrane can have small pores with a predetermined mean diameter between 1 to 1000 micrometers. In some instances, the pores can have a diameter between 3 to 100 micrometers. As such, in some instances the filter membrane can serve as a traditional filter by preventing particulate matter from penetrating and/or passing therethrough.

Not being bound by theory, placing a porous conductive membrane with a desired pore size within an electric field affords for charged particles only having to come within one-half of the distance of the pore size diameter in order to reach a collection area, i.e. an edge of a pore. The primary driving force on the charged particles is electrostatic precipitation toward the edge of the grounded metal membrane pore. Stated differently, electric field lines can direct charged particles to deposit on the edge of a grounded metallic membrane pore such that the LoP Filter does not rely solely on a bridging phenomenon for high collection efficiency. However, it is appreciated that the collection of the particles can be aided by complementary mechanisms such as interception, diffusion, and impaction.

The use of electrostatic precipitation in combination with the porous conductive filter membrane can provide a low pressure drop across the filter membrane and a low filter drag in the range of 0.0002 to 0.1 inches of water/ft/min as discussed in more detail below. In addition, the presence of an electric field can prevent momentary particulate matter emission spikes during a cleaning process, such emission spikes having been observed in conventional fabric filter particulate control devices due to a dependence on filter bridging effects.

The LoP Filter

The LoP Filter can thus provide a low pressure drop across a filter and still reduce particulate matter in a gas to desirable low levels. It is appreciated that both the LoP Filter and the AHPC technology employ electrostatic collection and surface filtration; however, the LoP Filter can provide much lower pressure drop than the AHPC technology. The AHPC technology employs a membrane fabric filter whereas the LoP Filter utilizes a porous conductive filter membrane with an open-pore structure that achieves superior filtration performance with a low pressure drop.

The LoP Filter can also achieve a high level of particulate matter control at lower pressure drops with higher filtration velocities than heretofor technologies. It is appreciated that low pressure drop for a particulate collection device is desirable since less energy is required to force the gas flow through the filter. Achieving a high level of particulate collection efficiency at a high flow velocity is also highly desirable since a higher velocity filter requires less collection area, which in turn makes the filter more economical to manufacture and more compact.

In some instances, the LoP Filter achieves low drag by employing a porous conductive filter with an open membrane structure of the appropriate size and shape so that a 'clean filter' drag is sufficiently low. In addition, the presence of the electric field affords for the charged particles to first collect on the edge structure of the pore openings, and then collect or build along electric lines of force toward the high-voltage corona discharge electrodes, rather than bridging across the pore openings. In contrast, conventional filter media form a continuous layer of particles over pore openings as soon as dust collects on the filter, thereby resulting in a significant pressure drop since the flow resistance through the continuous layer of particles is much greater than that of an initially clean filter media.

It is appreciated that a large pressure drop can also be obtained across the LoP Filter if filtration continues after the pore openings are allowed to bridge with particles. However, low drag operation can be maintained by cleaning of the LoP Filter before complete bridging of the filter membrane pore openings occurs.

The applied electric field can also "virtually" decrease membrane pore size of the LoP Filter so that the membrane is capable of capturing finer particles than conventional operation of the filter without an electric field applied. In this manner more and finer/smaller particles can be collected without bridging of the pores than compared to operation without the electric field. As such, the electric field provides a dual benefit of allowing operation with very low drag and achieving very high particle collection efficiency.

It is appreciated that conventional electrostatic collectors are limited by long distances that particles must travel to reach a grounded surface. In contrast, the LoP Filter places a porous conductive membrane with a pore size of mean diameter from about 1 to 1000 micrometers within an electric field. Therefore, charged particles travel a maximum distance of one-half the pore size diameter to reach a collection area. As such, high particle collection efficiency is substantially increased by significant reduction of the distance charged particles must travel to the nearest grounded collection surface.

Effective Pore Size

The LoP Filter has an "effective pore size" that is less than the actual physical pore size of the filter. For the purposes of the present invention, "effective pore size" is defined as a virtual pore size, in the presence of an electrostatic field, that has the same particle collection efficiency as the geometrically measured pore size has without an electrostatic field. It is appreciated that the pore size of a conventional filter affects particle capture efficiency with smaller pore sizes resulting in higher particle collection. For example, some PTFE filter membranes have a nominal 0.5-micrometer pore size to ensure highly efficient particle capture. However, the small pore size results in a large pressure drop as described above. In contrast, by applying an electrostatic field to the conductive membrane media of the present invention, the electrostatically enhanced effective pore size that particles can pass through is significantly reduced compared to the actual physical dimensions of the pores. In addition to relatively small effective pore size, the apparatus and process disclosed herein can achieve filter drag in the range of 0.0002 to 0.1 inches of water/ft/min.

Figure 11:
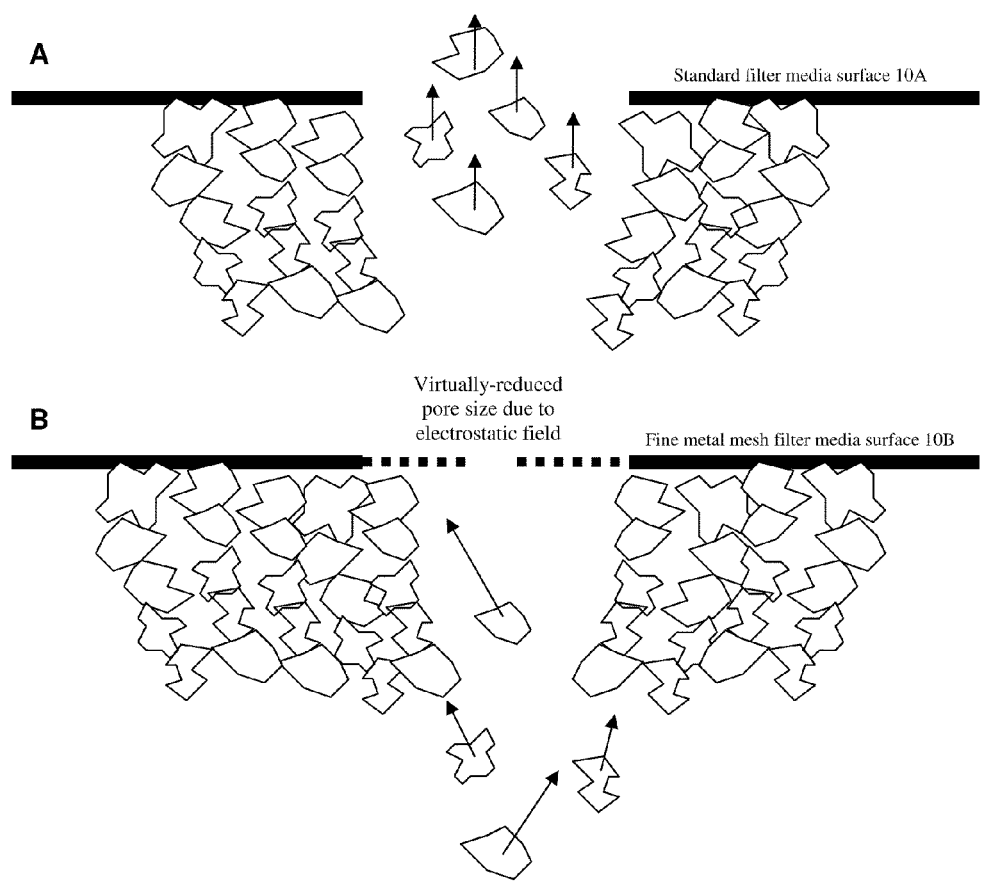
FIG. 11A is a schematic illustration of a filtration mechanism for a prior art filter.
FIG. 11B is a schematic illustration of a filtration mechanism according to an embodiment of the present invention.

Traditional depth filtration will capture particles in the manner illustrated schematically with reference to FIG. 11A. Individual particles are intercepted in a nearly random pattern, one particle attaching itself to another at any random angle relative to the filter surface. When enough particles attach to span the pore geometry completely, the pore is said to be bridged. In fact, a traditional filter relies upon this bridging for adequate particle collection efficiency. Once pore bridging begins, pressure drop across the filter media rises nearly exponentially.

In contrast, the electrostatic mechanism utilized in the process and apparatus in at least one embodiment described herein affords particles to be collected in dendritic patterns, nearly orthogonal to the filter surface, as shown with reference to FIG. 11B, thereby greatly slowing the process of complete pore bridging. Whereas a traditional filter may operate in the bridged regime 98% of the time, a LoP Filter avoids a complete bridged regime to realize its intended advantage. Stated differently, the LoP Filter does not rely upon complete bridging to effect optimal particle collection efficiency. In fact, it relies upon lack of complete bridging to both greatly reduce filter drag and to maximize electrostatic potential.

Eventually, collected particles can completely bridge the pores in the filter membrane, thereby resulting in a rapid increase in pressure drop. To prevent this, certain embodiments can feature the removal of accumulated particles from an inventive filter before there is a significant increase in pressure drop. By way of illustration and not limitation, the agglomerated filter cake can be removed from the filter by a reverse air jet or a high-air-pressure back-pulse of air. It is appreciated that such a technique for removal of the accumulated particles can require a dust collection reservoir, which would need to be periodically emptied. Likewise, mechanical methods including but not limited to shaking, vibration, brushing, or scraping can be used to remove accumulated particles. In any event, the nature of surface filtration and opening access of the Lo-P filter provide a filter can be relatively easy to clean.

A third approach to cleaning the LoP Filter can include "burning off" the collected material either by employing an oxidation catalyst or through thermal decomposition. In addition, the LoP filter can be operated such that the "burn off" of collected material is continuous and particles are oxidized immediately upon collection. It is appreciated that inorganic material would remain on the membrane surface and require secondary cleaning mechanisms.

The combination of high collection efficiency, low pressure drop, applicability to processes with high temperatures and excellent regeneration potential provides a filter having attractive particulate matter control properties applicable to various processes. The Lo-P Filter is also well suited for high temperature applications since it is not subject to the limitations of a typical bag house or a standard ESP, i.e. a typical bag house is limited by the service temperature of fabric filter bags with most, if not all polytetrafluoroethylene (PTFE)-based bags limited to about 500° F. service temperature. Fiberglass bags may be used in slightly higher temperatures, but are still limited to approximately 650° F. High-temperature, ceramic candle filters can be employed in very high temperature applications, however such filters are subject to a much higher pressure drop, even when clean and new. As such, the LoP Filter overcomes the limitation of conventional fabric filters by allowing the use of a conductive metal filter membrane that can operate at elevated temperatures compared to fabrics, polymers and the like.

Figure 2:
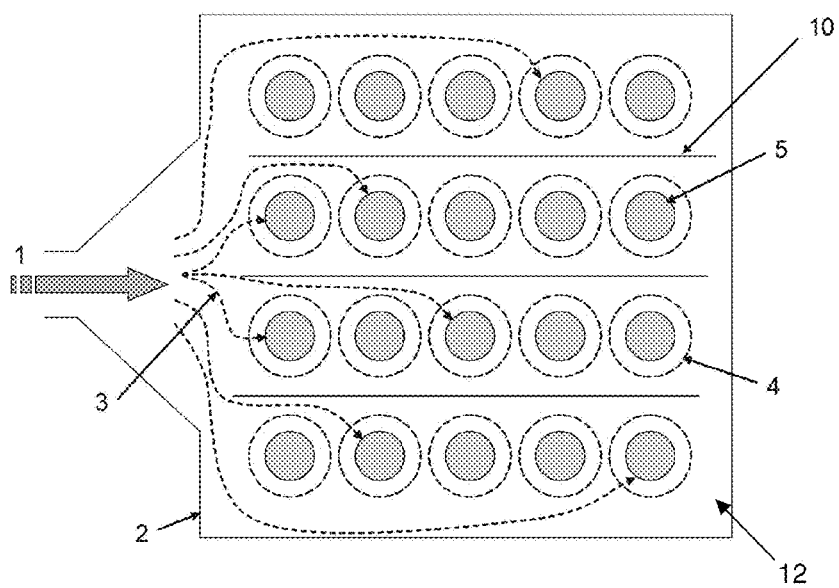
FIG. 2 is a schematic top view of the hybrid electrostatic precipitator/filter membrane shown in FIG. 1.

Referring now to FIGS. 1 and 2, a schematic front view and schematic top view, respectively, of an embodiment of a hybrid electrostatic precipitator/filter membrane is shown in which a gas stream 1 laden with particulate matter enters a particle control device 2. The gas stream splits into multiple streams 3 that can flow among and through a plurality of electrostatic precipitator/filter membrane elements 5. Upon passing through a corona-generating discharge electrode 4, a charge is placed on particles in the gas streams and the particles are subsequently carried or driven to a surface of an electrically grounded filter membrane 5. The filter membranes 5 can be constructed of any electrically conductive materials known to those skilled in the art, illustratively including metals, alloys, carbon composites, conductive ceramics and the like. The membrane filtration media desirably has a small and uniform pore size. In some instances, ultrafine precision-electroformed metal sieve material is used as the membrane filtration media.

A combination of small pore sizes and electrostatically driven particle mobility can act to retain the particulate matter on the surface of the membrane media, while still permitting gas to flow therethrough with a small pressure drop. Having passed through the filter membrane 5, a clean gas stream can be collected in a plenum 7 and carried to an outlet 8 of the device 2. It is appreciated that a plate 6 can separate a particulate-laden collection chamber 12 from the plenum 7. In addition, solid electrically conductive standoffs 9 can be used to ensure that the entire length of the porous membrane media is covered by a uniform electrostatic field generated by discharge electrodes 4.

In operation, a pressure drop across the filter membrane elements 5 can increase due to ash deposition in the form of filter cake thereon. As such, removal of the filter cake can become necessary with satisfactory filter cake removal mechanisms including reverse-gas pulse jet, mechanical shaking, acoustic vibration, mechanical brushing, mechanical scraping, thermal decomposition, and other mechanisms known to those skilled in the art. Grounded collection plates 10 can be included to recapture any re-entrained particles before, during, and after the filter cake removal process. The collection plates 10 can also serve as pre-collection surfaces to increase the time between required cleaning operation cycles.

Figure 3:
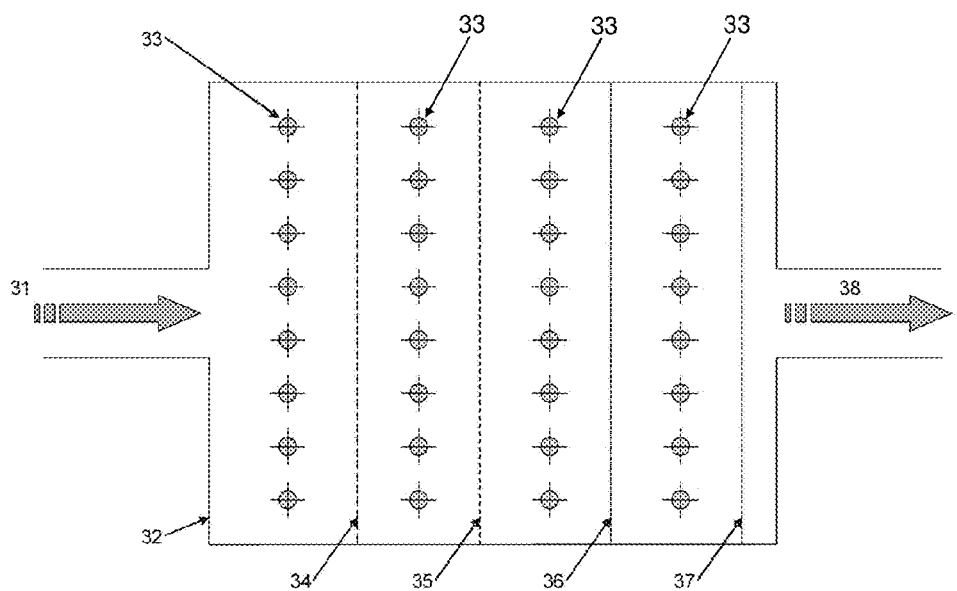
FIG. 3 is a schematic top view of a hybrid electrostatic precipitator/filter membrane according to another embodiment of the present invention.

Referring now to FIG. 3, an embodiment of a staged collection apparatus and process is shown in which a particle-laden gas stream 31 can enter a hybrid electrostatic precipitator/membrane filtration particle control device 32. Discharge electrodes 33 can impart a charge on particles flowing thereby and an electric field can be generated between the discharge electrodes 33 and a first grounded filter membrane 34 with the charged particles driven towards the filter 34. At the filter 34, the largest particles can be retained while smaller particles within the gas stream are permitted to pass through to the next stage. The next downstream grounded filter membrane 35 can have pores smaller in size than the pores in filter 34, and as such, filter 35 can collect particles that were allowed to pass through filter 34.

The device 32 affords for additional sections with each section having a grounded filter membrane 35-37 with successively smaller pore size. In the alternative, the additional sections can have a grounded filter membrane 35-37 with pores having generally the same size as the pores in filter 34, the filters 34 and 35 can have the same pore size and the filters 36 and 37 can have smaller pore sizes and the like. As such, it is appreciated that any number of different filter pore size configurations fall within the scope of the present invention. It is further appreciated that after the last ultrafine pore size filter membrane 37, a clean gas stream 38 can exit the particle control device 32.

Filter cake removal with the staged collection device 32 can be achieved by any of the means described earlier. In addition, embodiments using staged approaches can achieve an increased time period between cleanings by effectively dividing the bulk of the particulate matter in the gas stream between a plurality of collection surfaces that function as filter membranes. The internal structure of the filter cake can also be more porous than heretofor collected filter cakes, thereby decreasing the overall pressure drop across each element.

Several matching or suitably configured electrode geometries can be utilized to generate a uniform electrostatic field with electrode spacing, pre-collection plate spacing, filtration velocities, apparatus shell geometry, etc., all also varied within the context of this invention.

In preferred embodiments, an inventive apparatus can have: a chamber with inlet and outlet ports for the flow of gases through the chamber; at-least-one porous conductive grounded filter media of a strategic pore size and structure disposed within the chamber; at-least-one filter membrane in fluid communication with the outlet port of the chamber, and at-least-one high-voltage discharge electrode disposed between and separated from the at-least-one filter membrane and the inlet port of the chamber.

The apparatus can further have a series of baffles to evenly distribute the gas flow among the filter membranes and a plurality of air nozzles to periodically clean the at-least-one filter membrane using a reverse-flow gas pulse. Additionally, the pore size of the filter media can vary within an array of pores.

Bench-Scale Testing

Figure 4:
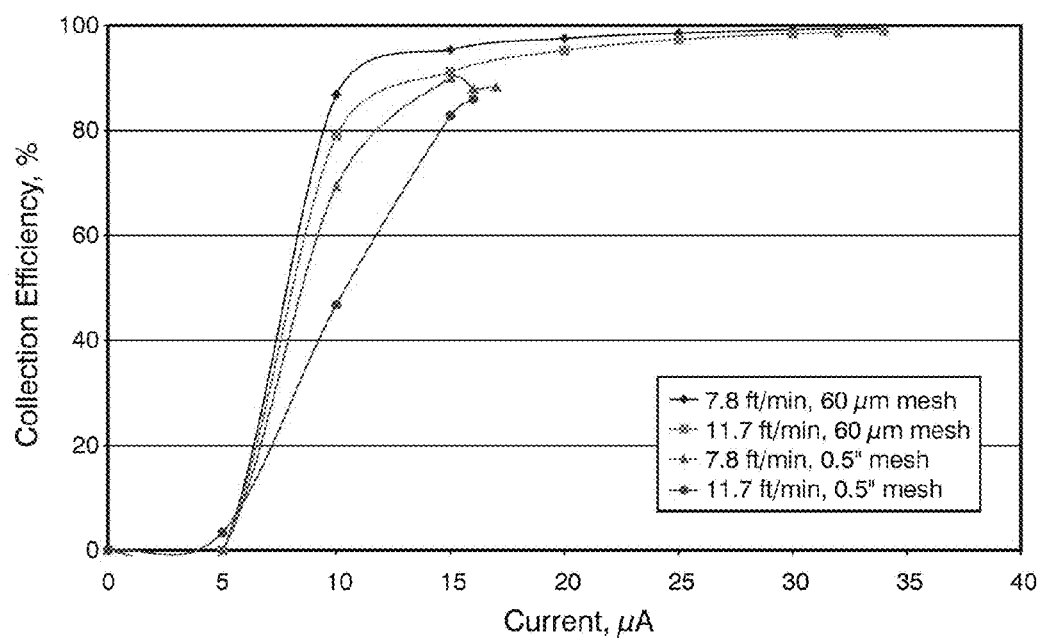
FIG. 4 is a plot of collection efficiency vs. current for an embodiment of the present invention.

Bench-scale testing proved the potential of the technology to control particulate matter emissions to a superior level. The bench-scale testing was conducted in order to evaluate the effect(s) of pore size, electrical input and particle size on particulate capture efficiency. For example, FIG. 4 provides data generated by the bench-scale testing showing results for a point-to-plane electrostatic precipitator incorporating a series of grounded wire cloth swatches with varying pore sizes as the collection/filtration surface. As shown in this figure, the application of current to the point-to-plane precipitator provides a drastic increase in collection efficiency.

Figure 5:
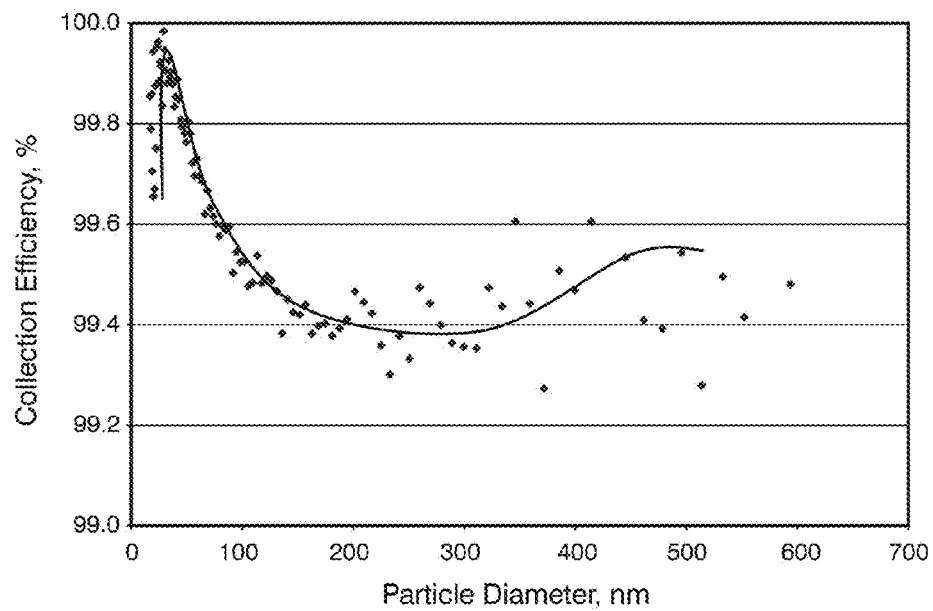
FIG. 5 is a plot of collection efficiency vs. particle diameter for an embodiment of the present invention.

Additional bench-scale testing focused on the benefits of using conductive membranes with smaller pore sizes by replacing the relatively coarse wire cloth with precision-electroformed sieve material having a tight pore size distribution and small pores. FIG. 5 provides data obtained from the additional bench-scale testing with high collection efficiencies observed over a broad range of particle sizes, even relatively small particle sizes (e.g. <100 nm) traditionally known to be the most difficult to capture in electrostatic precipitators. Such small sized particulates have traditionally been captured using the PTFE filter membrane bags described earlier, but only with an associated high pressure drop.

Pilot-Scale Testing

Figure 6:
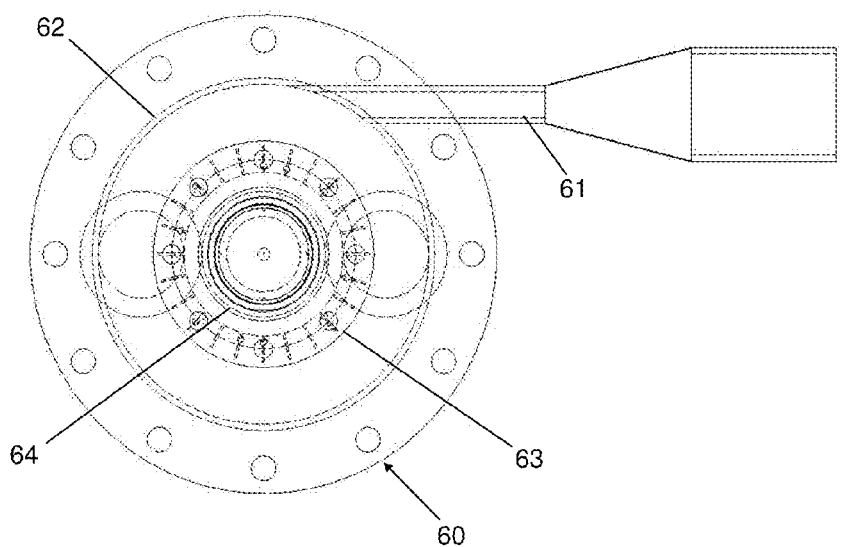
FIG. 6 is a top view of a hybrid electrostatic precipitator/filter membrane according to an embodiment of the present invention.
Figure 7:
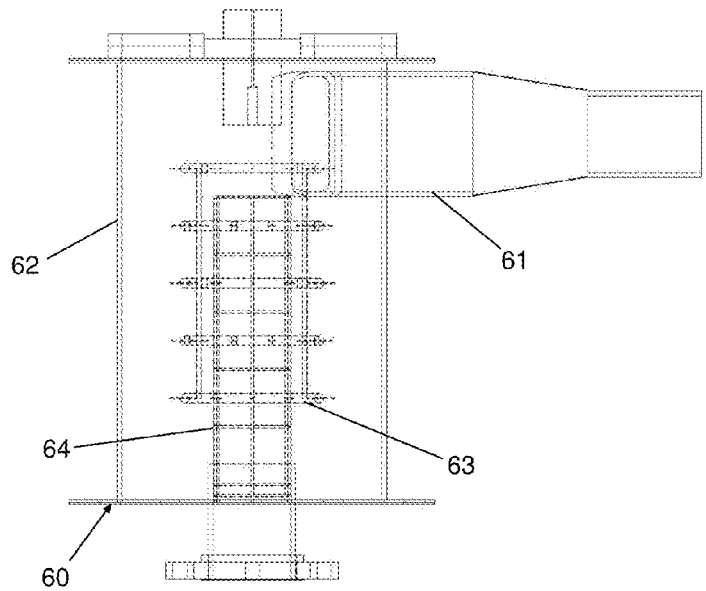
FIG. 7 is a side view of a hybrid electrostatic precipitator/filter membrane shown in FIG. 6.

Pilot-scale testing was also performed with several hardware configurations involving electrode placement, mesh placement, mesh shape, flow patterns and canister shape manipulated as independent design parameters. The testing was conducted with a modern 5.9-liter John Deere diesel engine connected to a dynamometer and a prototype particle emission control apparatus 60 as illustrated in FIGS. 6 and 7. FIG. 6 provides a schematic top view and FIG. 7 provides a schematic side view of the prototype apparatus 60. The prototype 60 has a tangential entrance 61 to a filter housing 62 in order to induce cyclonic pre-collection. In addition, an inventive high-voltage discharge electrode 63 and a cylindrical filter element 64 fabricated from stainless steel wire cloth having 37-micrometer sized openings were included. High voltage was supplied by a solid-state external power supply and emissions from the John Deere diesel engine were measured before and after the prototype 60 with a scanning mobility particle sizer (SMPS) and an aerodynamic particle sizer (APS).

Figure 8:
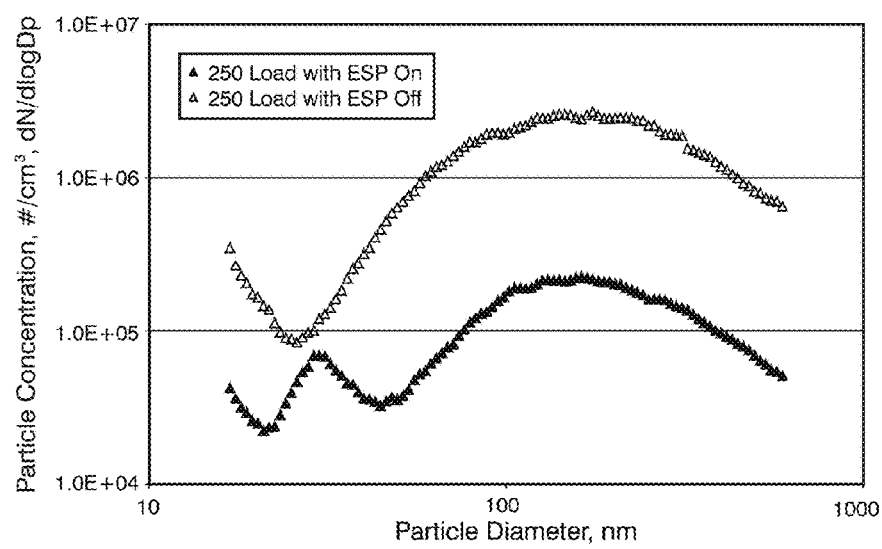
FIG. 8 is a plot of particle concentration collected vs. particle diameter for an embodiment of the present invention.

Table 1 provides emission data for the prototype apparatus 60 for an engine load of 0, 210 and 250, with and without an applied electric field across the gap or space discharge electrode 63 and filter element 64. In addition, FIG. 8 provides data for a filtration velocity of 26 ft/min (7.92 m/min).

TABLE 1

| Engine Load | Filtration Velocity | Voltage/Current | Efficiency, % |
|---|---|---|---|
| 0 | 20 ft/min | 0/0 | 31.1 |
|  |  | 285.1 kV/5 mA | 96.4 |
| 210 | >50 ft/min | 0/0 | 25.3 |
|  |  | 14.8 kV/1.5 mA | 90 |
| 250 | 12 ft/min | 0, 0 | 85.6 |
|  |  | 15-25 kV/2-4 mA | 99.6 |
|  | 26 ft/min | 0/0 | 65.0 |
|  |  | 17-24 kV/0.85-1.7 mA | 97.9 |

It is important to note that the observed level of control was achieved with a pressure drop of only a few tenths of an inch of water across the filter element and was consistent with the pressure drop calculated for a clean wire mesh cloth. As such, as long as the pores of the conductive filter element do not bridge with particles, a low pressure drop can be maintained. In addition, it was determined that an area of the filter element was without satisfactory electric field coverage, and although excellent results were obtained, emissions could have been lower with a uniform electric field applied thereto.

Figure 9:
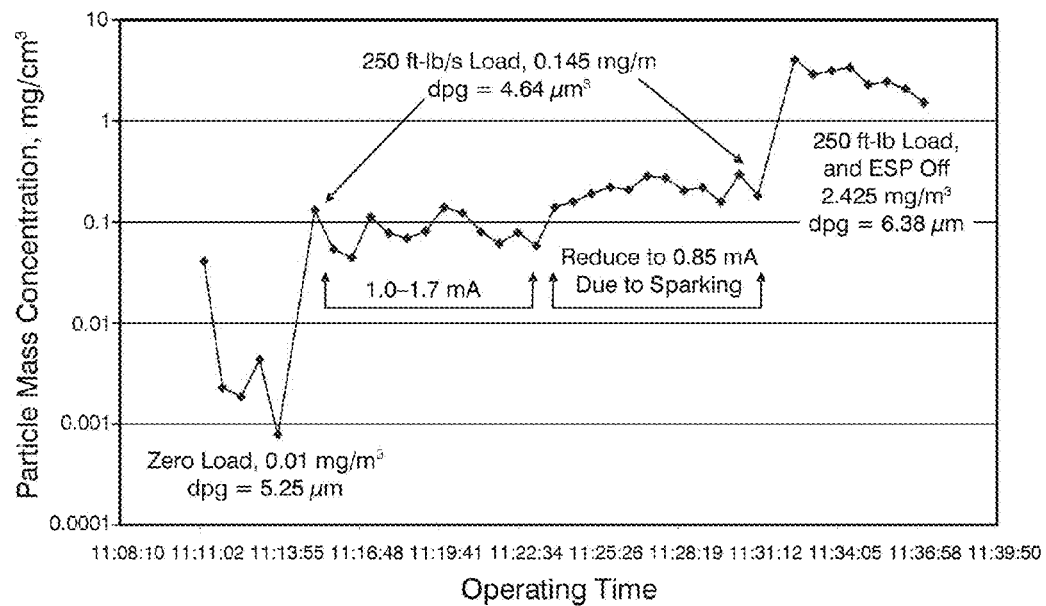
FIG. 9 is a plot of particle mass concentration vs. operating time for tests according to an embodiment of the present invention.

Future regulations will likely focus on ultrafine emissions due to its impact on various health effects. The data in FIG. 8 clearly demonstrates that very high collection efficiencies are obtained for ultrafine particle size range. Additionally, FIG. 9 exemplifies the benefit of the electric field on emissions at a moderate filtration velocity of 26 ft/min.

Large-Scale Testing

Figure 10:
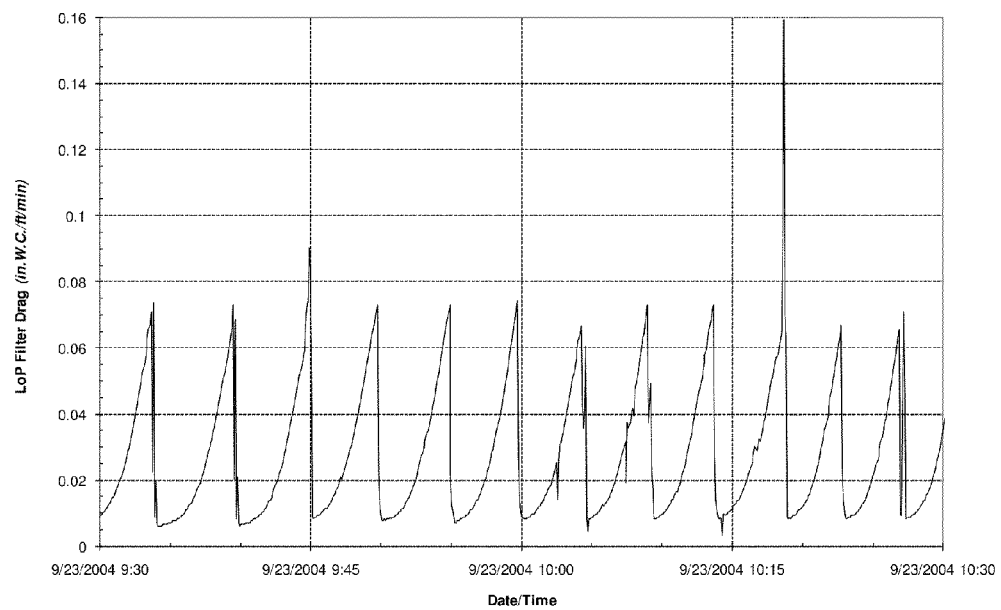
FIG. 10 is a plot of filter drag for a hybrid electrostatic precipitator/filter membrane according to an embodiment of the present invention.

Further testing was completed using coal combustion-related pilot facilities to illustrate the performance of the apparatus and process in a high dust-loading environment. Results of this test effort further validated the above results, namely, high collection efficiency with ultralow pressure drop across the filter as illustrated by the plot of filter drag as a function of operation time shown in FIG. 10.

Based on the above-described test results, an extremely broad range of applications can use the inventive apparatus and process described in this disclosure. Such applications are included by way of illustration and not limitation.

While the preferred embodiments of the invention have been shown and described, modifications thereof can be made by one skilled in the art without departing from the spirit and teachings of the invention. The embodiments described herein are exemplary only and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference is not an admission that it is prior art to the present invention, especially any reference that may have a publication date after the priority date of this application. The disclosures of all patents, patent applications, and publications cited herein, and the appendices which follow, are hereby incorporated herein by reference in their entirety, to the extent that they provide exemplary, procedural, or other details supplementary to those set forth herein.

We claim:

1. A process for removing particulate from a gas stream, the process comprising:
    providing a porous conductive filter membrane having pores;
    creating an electrostatic field across the pores of the conductive filter membrane;
    flowing a gas stream with particulate through the pores of the porous conductive filter membrane, the applied electrostatic field reducing the pore size of the conductive filter membrane to an effective pore size, thereby preventing the passage of at least a portion of the particulate through the conductive filter membrane and removing it from the gas stream with low filter drag, high filtration velocity, or a combination thereof.

2. The process of claim 1, wherein the porous conductive filter membrane has a plurality of pores, the plurality of pores having a pore diameter in the range of 1.0 to 1000 micrometers.

3. The process of claim 1, wherein the filter drag is between 0.0002 to 0.1 inches of water/ft/min.

4. The process of claim 1, further comprising regenerating the porous conductive filter membrane by removing at least part of the particulate from the porous conductive filter membrane.

5. The process of claim 4, wherein regenerating the porous conductive filter membrane is performed by a process selected from a group consisting of use of a reverse air jet, mechanical removal of the particulate, thermal decomposition of the particulate and combinations thereof.

6. The process of claim 1, wherein the porous conductive filter membrane has a catalyst, the catalyst catalyzing at least a portion of the particulate.

7. The process of claim 1, further comprising providing a plurality of stages having a porous conductive filter membrane, each of the porous conductive filter membranes having a plurality of pores.

8. The process of claim 7, wherein pore sizes of each porous conductive filter membrane are generally equal.

9. The process of claim 7, wherein pore sizes of each successive porous conductive filter membrane downstream from a previous porous conductive filter membrane decrease in size.

10. The process of claim 7, wherein pore sizes of each successive porous conductive filter membrane downstream from a previous porous conductive filter membrane vary in size.

11. The process of claim 1, wherein the gas stream has a temperature between 10 and 2000° F.

12. The process of claim 1, further comprising providing a discharge electrode, wherein the electrostatic field is provided by applying a negative polarity high voltage to the discharge electrode and electrically grounding the porous conductive filter membrane.

13. The process of claim 1, further comprising providing a discharge electrode, wherein the electrostatic field is provided by applying a positive polarity high voltage to the discharge electrode and electrically grounding the porous conductive filter membrane.

14. The process of claim 1, further comprising providing a discharge electrode, wherein the electrostatic field is provided by applying a high-voltage potential difference between the discharge electrode and the porous conductive filter membrane.

15. An integrated electrostatic collection and electrostatically enhanced filtration process for removing particulate from a gas stream, the process comprising:
   providing a porous conductive filter membrane having pores;
   applying an electrostatic field to the porous conductive filter membrane and simultaneously creating an electrostatic field across the pores of the conductive filter membrane;
   flowing a gas stream with particulate through the pores of the porous conductive filter membrane, the applied electrostatic field reducing the pore size of the conductive filter membrane to an effective pore size and preventing the passage of at least a portion of the particulate through the conductive filter membrane; and
   collecting at least a portion of the particulate on the porous conductive filter membrane and thereby removing the portion of the particulate from the gas stream with low filter drag and/or high filtration velocity across the porous conductive filter membrane.

16. An apparatus for removal of particulate from a gas stream, said apparatus comprising:
   a chamber having an inlet and an outlet, said chamber operable for a gas stream to enter through said inlet and exit through said outlet;
   a porous conductive filter membrane having pores and located within said chamber and in fluid communicating with said inlet and said outlet;
   a high-voltage discharge electrode located between said inlet and said porous conductive filter membrane; and
   a high-voltage source operable to apply a high-voltage potential difference between said high-voltage discharge electrode and said porous conductive filter membrane and create a reduced pore size by an electrostatic field preventing passage of at least a portion of the particulate through said pores.

17. The apparatus of claim 16, further comprising a plurality of porous conductive filter membranes and a plurality of baffles located within said chamber, said baffles operable to generally evenly distribute the gas stream among said plurality of porous conductive filter membranes.

18. The apparatus of claim 16, wherein said porous conductive filter membrane is a thin precision membrane having a uniform pore size.

19. The apparatus of claim 18, wherein said uniform pore size has a pore diameter between 1 to 1000 micrometers.

20. The apparatus of claim 16, wherein said porous conductive filter membrane has a plurality of pores, said plurality of pores having varied pore sizes.

* * * * *